United States Patent [19]
Shiba et al.

[11] 3,990,733
[45] Nov. 9, 1976

[54] HUB FOR MAGNETIC TAPE

[75] Inventors: Haruo Shiba; Kimio Tanaka, both of Tokyo, Japan

[73] Assignee: TDK Electronics Company, Limited, Tokyo, Japan

[22] Filed: Oct. 30, 1975

[21] Appl. No.: 627,230

[30] Foreign Application Priority Data
Dec. 20, 1974 Japan.............................. 49-154953

[52] U.S. Cl. ................................................. 242/74
[51] Int. Cl.² ......................................... B65H 75/28
[58] Field of Search..................... 242/74, 74.1, 74.2

[56] References Cited
UNITED STATES PATENTS

| | | |
|---|---|---|
| 618,602 | 1/1899 | Davis ................................. 242/74.2 |
| 3,352,169 | 11/1967 | Delin ............................. 242/74.2 X |
| 3,523,654 | 8/1970 | Zielke ................................ 242/74.1 |
| 3,620,469 | 11/1971 | Riedel.................................... 242/74 |

Primary Examiner—Edward J. McCarthy
Attorney, Agent, or Firm—Neuman, Williams, Anderson & Olson

[57] ABSTRACT

A hub for winding a magnetic tape thereon comprises a clamp for retaining one end of a magnetic tape. The novel tape clamp comprises a substantially rigid upper web, a resilient lower web and a pair of legs depending from the ends of the upper web and connected to the ends of the lower web. The lower web supplements the resilient force of the legs. As the upper web is not subjected to a stress, the magnetic tape is wound properly on the upper web.

12 Claims, 10 Drawing Figures

HUB FOR MAGNETIC TAPE

BACKGROUND OF THE INVENTION

The present invention relates to a hub for magnetic tape reels or magnetic tape casettes, and more particularly to an improvement in a hub of such type provided with a tape clamp.

Typical clamps which have been conventionally used for retaining one end of a magnetic tape on the periphery of a hub of a reel or casette on which the tape is wound are those illustrated in FIGS. 1(a) and 1(b). These clamps comprise a web 1 and a pair of legs 2, 2 depending from the opposite ends of the web 1. The free ends of the legs 2 have stop ears which are adapted to be received in corresponding complementary slots of a hub (not shown). The clamps are integrally formed from a resilient but sufficiently rigid plastic material. In use, the legs 2 are bent inwardly with a suitable means (not shown) in the direction indicated by arrows and then inserted in a recess of the hub formed at a position along the periphery of the hub, with one end of a magnetic tape interposed between the clamp and the recess. More particularly, the web 1 of the clamp takes the form as illustrated in FIG. 2(a) prior to its insertion in the recess of the hub. Accordingly, the cross section as viewed from the line A—A of FIG. 2(a) will take the form as illustrated in FIG. 2(b) and, assuming that a tape 3 be wound on it, the wound tape 3 would be straight in its cross section. However, as the actual clamp is bent by inwardly urging the pair of legs before insertion of it into the recess, the web 1 is bent as shown in FIG. 3(a) and subjected to a non-uniform stress which causes the edges of the web 1 to upwardly curl as shown in FIG. 3(b). Accordingly, the tape 3 wound on it tends to curl along its edges as illustrated in FIG. 3, with a result that the tape is slightly stretched along its edges.

If this occurs, the recording or reproduction is necessarily adversely affected and such defects as leap in sound at spaced intervals of time, lowering of sound level and the like are encountered.

SUMMARY OF THE INVENTION

Accordingly, an object of the present invention is to provide an improved hub which eliminates such prior art disadvantages.

Another object of the present invention is to provide a magnetic tape hub provided with an improved tape clamp which has sufficient resiliency and restoring force for clamping one end of a magnetic tape and yet has sufficient rigidity at the web portion.

A further object of the present invention is to provide a tape clamp of the aforesaid nature.

According to the present invention, there is provided a hub having a tape clamp, wherein said clamp comprises a substantially rigid upper web, a pair of relatively thin resilient legs depending from the opposite ends of said web, stop ears provided at the lower ends of said legs, and a relatively thin resilient lower web connecting the lower ends of said legs.

The advantages resulting from this construction are that the upper web of the clamp is sufficiently rigid so that it is not substantially deformed by the force exerted on the legs of the clamp, that the restoring force of the legs is assisted by the presence of the resilient lower web, and that the magnetic tape is wound regularly and neatly.

DETAILED EXPLANATION OF THE INVENTION

The present invention will be readily understood when reference is made to the following explanation in connection with the attached drawings, wherein FIGS. 1(a) and (b) are elevational views, showing two types of the conventional tape clamps;

Figure 4:
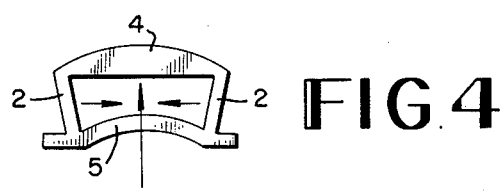
FIG. 4 is an elevational view of a tape clamp according to the present invention.
Figure 5A:
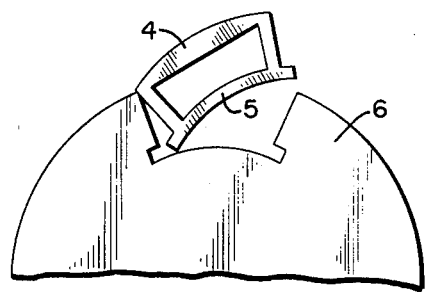

FIGS. 5(a), (b) and (c) are explanatory views, illustrating the sequence of insertion of the tape clamp shown in FIG. 4 into the recess of a hub.

Reference is made particularly to FIG. 4, wherein a clamp for a casette tape hub according to a preferred embodiment of the present invention is illustrated. The clamp comprises an upper web 4 having a sufficient thickness so as to make it substantially rigid, a lower web 5 having a relatively small thickness so as to make it substantially resilient, and a pair of relatively thin resilient legs 2 and 2. The legs 2 and 2 are jointed at the upper ends to the opposite ends of the upper web 4 and at the lower ends to the lower web 5. Each of the legs 2 and 2 is further provided with a stop or locking ear adapted to fit in a corresponding complementary slot formed in a hub 6 (FIG. 5). The clamp is integrally formed from a plastic material in a molding process.

Figure 1A:
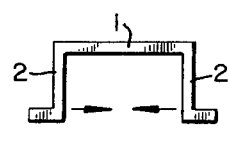
Figure 2A:
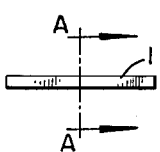
FIG. 2(a) is a view, showing the web portion of the clamp shown in FIG. 1(a)
Figure 2B:
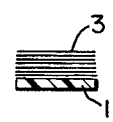
FIG. 2(b) is a cross sectional view taken along the line A—A of FIG. 2(a) with a magnetic tape thereon.
Figure 1B:
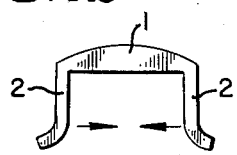
Figure 3A:
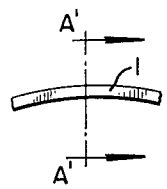
FIG. 3(a) illustrates the web portion of FIG. 1(a) after it has been bent.
Figure 3B:
FIG. 3(b) is a cross sectional view takes along the line A'—A' of FIG. 3(a) with a magnetic tape thereon.

It is to be noted that the legs 2 and 2 are sufficiently thin while the upper web 4 is made sufficiently thick, to such extent that the upper web 4 is not substantially deformed when the legs 2 and 2 are urged or pushed inwardly as shown by arrows in FIG. 4. In other words, the thickness of the legs 2 and 2 must be thinner than that of the conventional clamps shown in FIG. 1 because the upper web 4 is not deformable and hence the legs must have corresponding more resiliency for easy insertion of the clamp into the recess of the hub.

However, thusly formed legs will lose their rigidity which is necessary for properly retaining the clamp and accordingly the clamped tape in position. The lower resilient web 5 serves to strengthen the legs 2 and 2. The lower web 5 is preferably arcuated as shown in FIG. 4, so that it can be easily deformed in the direction indicated by dotted arrow when an external force is applied inwardly to the legs in the direction indicated by solid arrows.

With use of the resilient lower web 5, the restoring force or rigidity of the legs 2 and 2 are properly augmented and when the legs are pushed in the direction indicated by arrows (FIG. 4) the upper web 4 is little deformed while the legs 2 and the lower web 5 are deformed in the directions indicated by the solid and dotted arrows.

Figure 5B:
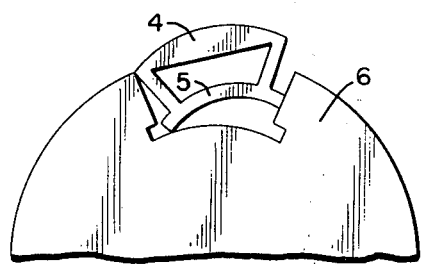
Figure 5C:
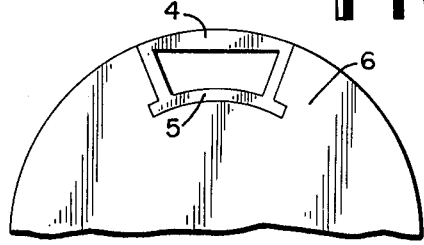

FIG. 5(a), (b) and (c) illustrate in this sequence the steps of inserting the clamp of the present invention into a recess formed in the hub 6 with one end of a magnetic tape (not shown) interposed between the wall of the recess and the clamp. The clamp is first inserted in the recess as shown in FIG. 5(a). An external force is applied to the legs. This causes the lower web 5 to deform as shown in FIG. 5(b). When the stop or locking ears are properly received in the slots of the hub the clamp almost restores to its original shape in stress as shown in FIG. 5(c). The upper surface of the upper web 4 forms a part of the circumferential outer periphery of the hub in this position.

In summary, the present invention provided a novel clamp which has a substantially rigid upper web. This insures that a magnetic tape can be wound properly and regularly without local stress. The legs of the clamp are made thin to have more resiliency and the restoring force is assisted by the presence of the lower resilient web.

What we claim is:

1. A hub for winding a magnetic tape thereon, including a recess on the periphery of said hub and a tape clamp received in said recess, characterized in that said clamp comprises a substantially rigid upper web, a pair of resilient legs jointed to the opposite ends of said upper web, and a resilient lower web connecting the lower ends of said legs.

2. A hub according to claim 1, wherein said clamp is formed from a plastic material as an integral unit.

3. A hub according to claim 1, wherein the lower ends of said legs are provided with stop ears adapted to be received in slots in the recess.

4. A hub according to claim 1, wherein said resilient lower web is arcuated upwardly at least at a portion of its length.

5. A hub according to claim 1, wherein said pair of legs and the lower web have, in combination, a sufficient restoring force to clamp a magnetic tape.

6. A hub according to claim 2, wherein said upper web is made thick and said legs and said lower web are made thin in such degree that the upper web is substantially rigid while the legs and the lower web are substantially resilient and have a sufficient restoring force.

7. A tape clamp for clamping one end of a magnetic tape on a hub, which comprises a substantially rigid upper web, a pair of resilient legs jointed to the opposite ends of said upper web, and a resilient lower web connecting the lower ends of said legs.

8. A tape clamp according to claim 7, wherein said clamp is formed from a plastic material as an integral unit.

9. A tape clamp according to claim 7, wherein the lower ends of said legs are provided with stop ears adapted to be fit in slots in the hub.

10. A tape clamp according to claim 7, wherein said resilient lower web is arcuated upwardly at least at a portion of its length.

11. A tape clamp according to claim 7, wherein said pair of legs and the lower web have, in combination, a sufficient restoring force to clamp a magnetic tape.

12. A tape clamp according to claim 8, wherein said upper web is made thick and said legs and said lower web are made thin in such degree that the upper web is substantially rigid while the legs and the lower web are substantially resilient and have a sufficient restoring force.

* * * * *